Oct. 16, 1934.　　　　H. E. NEUS　　　　1,977,197
CONTROLLING MEANS FOR WEB WINDING MACHINES
Filed May 28, 1931　　3 Sheets-Sheet 1

Patented Oct. 16, 1934

1,977,197

UNITED STATES PATENT OFFICE 1,977,197

CONTROLLING MEANS FOR WEB WINDING MACHINES

Harry E. Neus, New York, N. Y.

Application May 28, 1931, Serial No. 540,717

2 Claims. (Cl. 242—75)

This invention relates to systems and apparatus for controlling the supply of power to electrical machines and particularly to systems and apparatus for controlling the power supplied to electric motors operating web winding machines where it is desired to maintain the web under uniform tension during winding, but its usefulness is not limited to such application. One object of this invention is to provide an improved means for automatically regulating the output of an electric motor operating a web winding machine. Another object is to automatically regulate the output of an electric motor operating a web winding machine so as to hold a substantially uniform tension on the web, and a further object of this invention is to automatically regulate the output of an electric motor operating a web winding machine in accordance with the variations in the tension of the web.

In the drawings—

Figure 4 is a partial plan view showing one way of mounting the contacts at the wattmeter; and Figure 5 is a view in front elevation of the structure shown in Figure 4.

Figure 1:
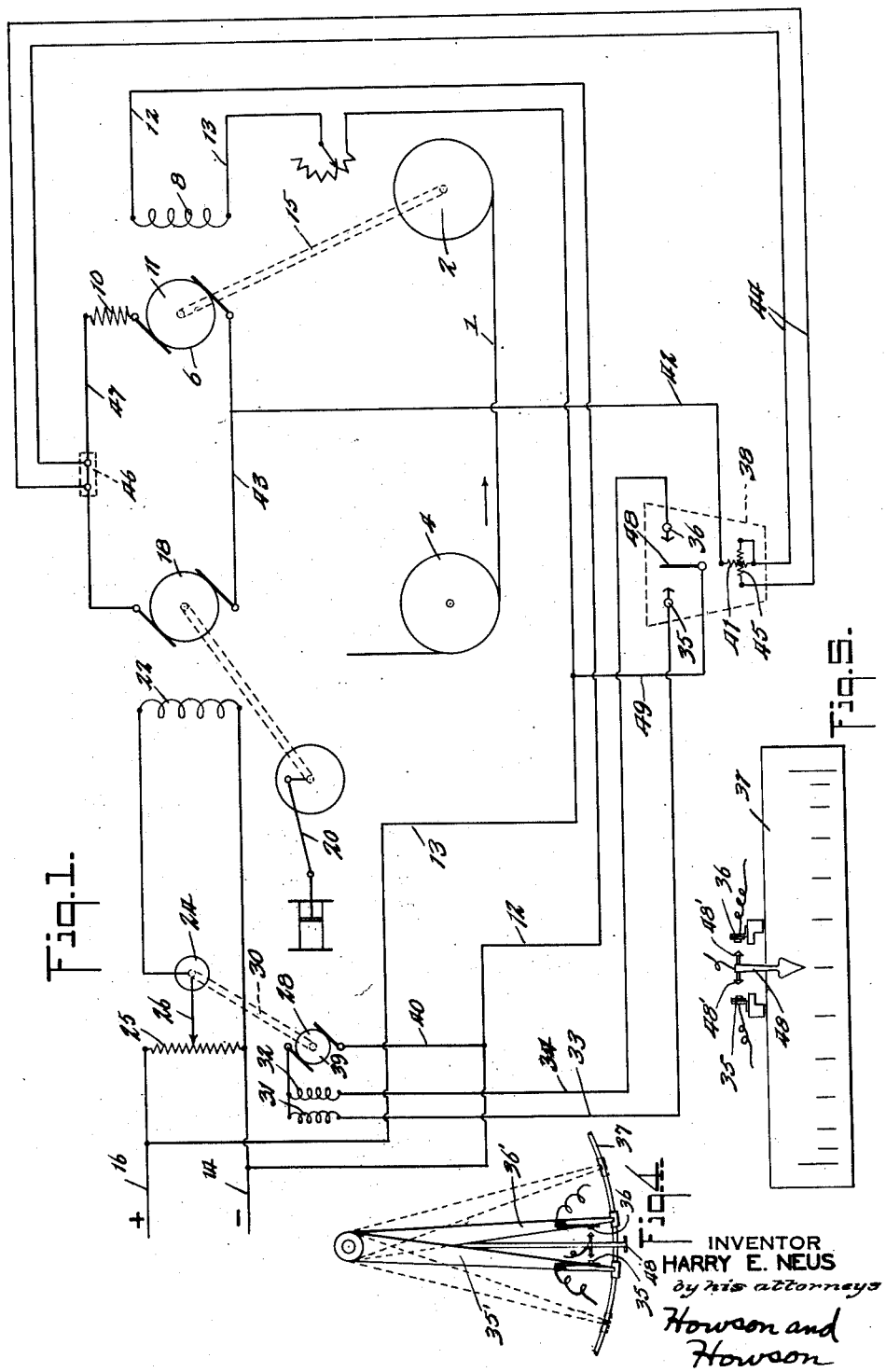
Figure 1 is a diagrammatic view showing one form of this invention.

In the drawings apparatus constructed in accordance with this invention is shown applied to a web winding apparatus in which the web 1 is wound upon a drum or spindle 2, the web passing to the drum or spindle over a roll 4 interposed between the drum 2 and a processing machine such as a calendering machine which delivers the web at a substantially uniform rate.

To operate the drum or spindle 2 there is provided a motor 6 shown as a compound motor having a separately excited field 8 and a series field 10 which reinforces the shunt field. The field 8 is shown as connected by leads 12 and 13, in which a suitable rheostat may be placed to a suitable source of electric current, as the main power leads 14 and 16. The shunt field serves to limit the motor speed in case the web breaks and is designed to permit a speed in excess of the normal winding speed of the motor when the spindle 2 is empty. The armature 11 of the motor 6 is connected by a suitable drive 15 to the drum or spindle 2. As shown, the motor 6 is connected in circuit with the armature of a generator 18 driven by a suitable motor or engine 20 and having a separately excited field 22 which is supplied with current from the main power leads 14 and 16 through a rheostat 24. The rheostat 24 is shown as comprising a coil 25 connected across the main power leads 14, 16 and an adjustable contact 26 which engages the coil 25 and varies the current supplied the field 22 of the generator 18. The rheostat 24 is operated by a suitable motor 28 connected thereto by a suitable drive 30. In order that the motor 28 may operate the rheostat 24 in both directions the motor 28 is provided with oppositely wound series fields 31 and 32 which are connected by leads 33 and 34 respectively to adjustable contacts 35 and 36 of the wattmeter 38. Both fields 31, 32 are connected to one side of the armature 39 of the motor 28 while the opposite side of the armature is connected by lead 40 to the lead 12 which is connected with the main power lead 14. The wattmeter 38 is provided with a voltage coil 41 connected through lead 42 to the lead 43 forming one side of the circuit connecting the generator 18 with the motor 6 while the other side of the voltage coil is connected to one of the leads 44 which extend to the current coil 45 from the shunt 46 in the lead 47 forming the other side of the circuit connecting the generator 18 with the motor 6. The indicator or needle 48 of the wattmeter 38 carries contacts which cooperate with contacts 35 and 36 and are connected through lead 49 to the lead 13 which is connected to the main power lead 16. As shown in Fig. 4 the arms 35' and 36' on which the contacts 35 and 36 are mounted are pivoted at the axis of curvature of the dial 37 and may be moved to different positions on the dial so that the contacts 35 and 36 can be adjusted not only with respect to the wattmeter dial but with respect to each other. In this way the setting of the wattmeter can be varied and the variation permitted before the contacts 35 and 36 are engaged by the contacts 48' on the wattmeter needle 48 can be changed. Suitable means extending to the outside of the wattmeter casing are provided for adjusting the positions of the arms 35' and 36'.

In operating the device, current is supplied to the field 8 of the motor 6, the rheostat 24 is adjusted to supply current to the field 22 and the generator 18 is operated starting the motor 6 and operating drum 2 to wind the web 1 thereon. With the motor 6 operating at the proper speed the indicator or needle 48 of the wattmeter 38 will be positioned between the adjustable contacts 35 and 36, the contacts 35 and 36 having been adjusted to allow a slight swinging of the indicator 48 without engaging the contacts 35 and 36 when the motor 6 is receiving the power necessary to place the proper tension to be exerted on the web 1. As the web 1 is wound on the drum 2 the diameter thereof increases and a uniform speed of the motor tends to increase the rate at which the web 1 is wound but inasmuch as the machine processing the web delivers it at substantially a uniform rate this increases the tension on the web 1 and increases the load on the motor 6. An increase of the load upon the motor thus occasioned causes a corresponding increase in the power supplied to the motor and in the indication given by the wattmeter 38 and when the increase is sufficient to cause the indicator 48 to engage with the contact 36 a circuit is completed from the main power lead 16 through the lead 13, lead 49, indicator 48, contact 36, lead 34, series field 32, armature 39 of the motor 28, lead 40 and lead 12 to the other lead 14 of the power supply. The field 32 is arranged so that the motor 28 will operate the rheostat 24 in a direction to decrease the current supplied to the field 22, thus weakening the field 22 and reducing the voltage of the generator 18. With the voltage of the generator 18 reduced the input into motor 6 is reduced and the motor tends to slow and reduces the tension on the web 1. For any reduction in the tension of the web 1 the load on the motor 6 is reduced, decreasing the current taken by the motor 6 and reducing the indication given by the wattmeter 38. Upon a sufficient reduction the indicator 48 of the wattmeter 38 will contact with the contact 35 completing a circuit from the main power lead 16 through the indicator 48 and contact 35, series field 31, armature 39 of the motor 28 and leads 40 and 12 to the other main power lead 14, operating the motor 28 in a direction to adjust the rheostat 24 to increase the current in the field 22 thus raising the voltage of the generator 18, increasing the current supplied to the motor 6 and tending to increase the speed of the motor 6, thus increasing the tension on the web 1. In this way, variations in the tension on the web 1 cause variations of the load upon the motor 6 which in turn causes variation in the indication of the wattmeter 38 and the adjustment of the rheostat 24 to either increase or decrease the voltage of the current supplied to the motor 6 with consequent adjustment of the tension on the web 1 and the power supplied to the motor so that the tension of the web 1 and the power supplied to the motor is maintained substantially uniform throughout the winding. Usually, however, the indicator 48 keeps contacting with the contact 36 thus gradually reducing the voltage supplied to the motor 6 throughout the winding of a roll. While the contacts 35 and 36 and indicator 48 are shown as directly controlling the circuits for the motor 28 it is to be understood that where found desirable the contacts may control the circuits of relay magnets which in turn control the circuits of the motor 28. Varying the field current of the generator 18 controls the motor 6 so gradually that there are no sudden changes made in the web tension thus reducing the tendency of the web to wave or vibrate and eliminating the danger of breaking the web and where it is desired to change the web tension such change can be effected by adjusting the positions of contacts 35 and 36 without stopping the winding. To aid the operator in adjusting the contacts 35 and 36 the wattmeter may be calibrated to indicate the web tensions.

Figure 2:
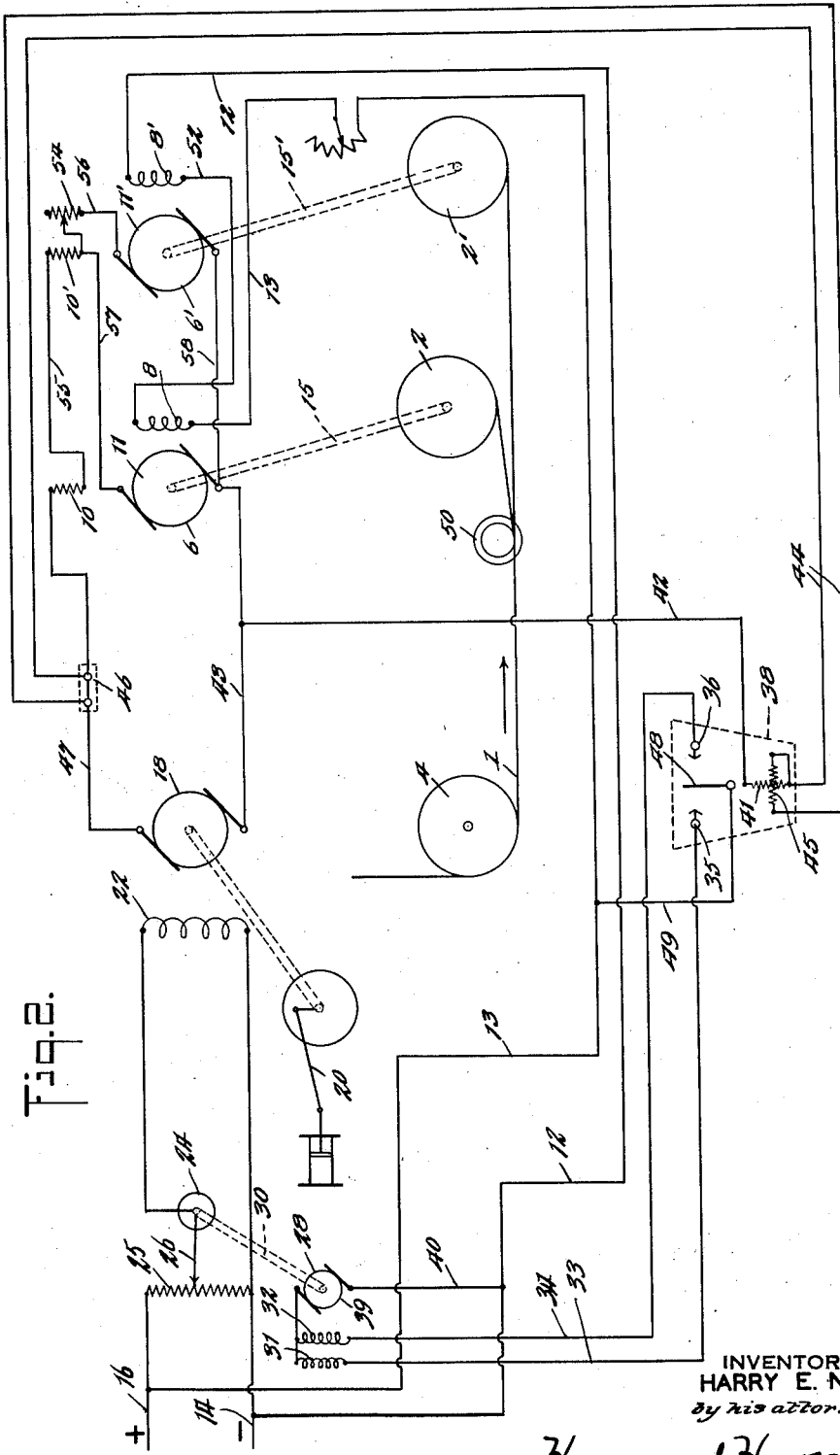
Figures 2 and 3 are similar views showing modifications.

In the modification shown in Figure 2 the web 1, after passing over the roll 4, is divided by a cutter 50, part of the web being wound on a drum or spindle 2 while the remainder is wound on the drum or spindle 2', the drums 2 and 2' being operated by the motors 6 and 6' through suitable driving mechanisms 15 and 15'. The motors 6 and 6' have separately excited fields 8 and 8' which are connected in series by means of a lead 52 and connected across the main power leads 14 and 16 by the leads 12 and 13 in which a rheostat may be placed if desired. The motors 6 and 6' have their series fields 10 and 10' connected in series and their armatures 11 and 11' connected in parallel so that the current supplied to the armatures 11 and 11' of both motors passes through both fields. Between the series field 10' and the armature of one of the motors, shown in the drawings as the armature 11', there is placed an adjustable resistance 54 which is adjusted in accordance with the distribution of the load resulting from the cutting of the web. The current for the motors 6 and 6' is supplied from a generator 18 through lead 47 to the series field 10 of the motor 6, lead 55 to the series field 10' of the motor 6' where it divides, a part passing through lead 57 to the armature 11 and through lead 43 back to the generator while the remaining current passes through the adjustable resistance 54 and lead 56 to armature 11' and through lead 58 to lead 43 and back to the generator 18.

As in the construction shown in Figure 1 the generator 18 is driven by a suitable motor or engine 20 and is provided with a separately excited field 22 supplied with current from the main power leads 14 and 16 through the adjustable rheostat 24. The rheostat 24 comprises a potentiometer coil 25 and a movable contact 26 operated by motor 28 through a suitable operating connection 30. The motor 28 is provided with oppositely wound series fields 31 and 32 connected to one side of the armature 39 of the motor 28 and through leads 33 and 34, respectively, to the contacts 35 and 36 of the wattmeter 38. The wattmeter 38 has the current coil 45 connected by leads 44 to the shunt 46 in the lead 47 leading to the motors 6 and 6' from generator 18 and the voltage coil 41 connected to one of the leads 44 and by lead 42 to the lead 43 in the circuit of the generator 18 and motors 6 and 6'. The wattmeter coils control an indicator 48 moving between the adjustable contacts 35 and 36 and connected by lead 49 to the lead 13 extending to the main power lead 16.

As in the previous construction variation in the tension of the web 1 causes variations in the load upon the motors 6 and 6' which in turn causes change in the indication of the wattmeter 38 resulting in a movement of the indicator 48 until it makes contact with either of the contacts 35 and 36 causing operation of the motor 28 to adjust the rheostat 24 and vary the voltage supplied by generator 18. The operation of this construction is identical with that of Figure 1 excepting that the wattmeter 38 measures the power supplied by the generator 18 to both motors instead of measuring the power supplied to one motor.

Figure 3:
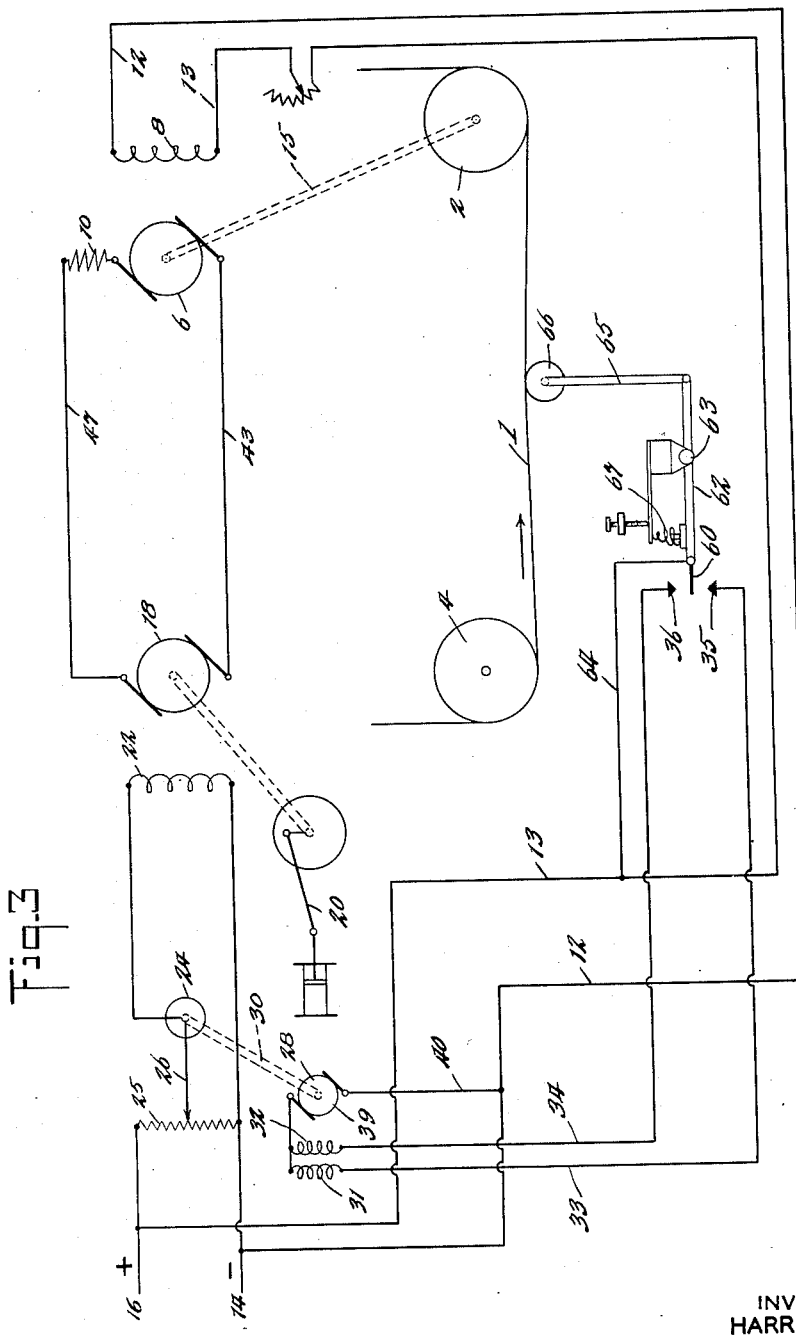

In the modification shown in Figure 3 the web 1 is wound on the drum or spindle 2 after passing over the roll 4 and the drum 2 is driven by a compound motor 6 through suitable driving mechanism 15 as in the construction shown in Figure 1. Also, as shown in that construction, the motor 6 has a field 8 separately excited through leads 12 and 13 from the main power leads 14 and 16 and the motor 6 is supplied with current from the generator 18 through lead 47, which current passes through the series field 10 and returns to the generator through the lead 43. The generator is driven through a suitable connection by a suitable motor or engine 20 and is provided with a separately excited field 22 controlled by a rheostat 24. The rheostat comprises a potentiometer coil 25 and the adjustable contact 26 operated through a suitable driving connection 30 by a motor 28. The motor 28 is provided with the oppositely wound series fields 31 and 32 which are connected to one side of the armature 39 and are connected by leads 33 and 34, respectively, to contacts 35 and 36.

The contacts 35 and 36 are adapted to be engaged by a contact 60 mounted upon one end of a lever 62 which is pivotally mounted as at 63. The contact 60 is connected by lead 64 to lead 13 and thus to the main power lead 16. The opposite end of the lever 62 carries a support 65 in which is mounted a roller 66 which bears against the web 1. The lever 62 is normally subjected to the pressure of a spring 67 which, under the normal tension of the web 1, displaces the web 1 slightly and maintains the contact 60 free from the contacts 35 and 36. In this construction a decrease in the tension of the web 1 permits the spring 67 to force up the support 65, raising the web 1 and bringing the contact 60 into engagement with the contact 35, operating the motor 28 and shifting the rheostat 24 to increase the current in the field 22. This will cause an increased voltage to be supplied by the generator to the motor 6 tending to increase the speed of the motor and thus increasing the tension on the web 1. The increased tension on the web 1 causes the operation of the support 65 and lever 62 against the action of the spring 67, separating the contact 60 from the contact 35 and causing the motor 28 to cease operating. If the tension on the web 1 becomes too great, the web 1 will operate the support 65 and lever 62 against the action of spring 67 to engage contact 60 with contact 36, energizing the motor 28 and causing it to operate in the reverse direction, adjusting the rheostat 24 to decrease the current in the field 22, reducing the voltage of the generator 18 and tending to decrease the speed of the motor 6, thus lessening the tension on the web 1 whereupon the spring 67 will operate to shift the lever 62 separating the contacts 60 and 36 and raising the web 1 slightly. It will be seen, therefore, that the motor 6 is regulated in accordance with the tension of the web 1 in order to maintain a substantially uniform tension thereon.

The construction shown in Figure 3 is substantially that as shown in my prior application, Serial No. 456,504, filed May 28th, 1930, of which application this application is a continuation in part.

I claim—

1. In a web winding apparatus, in combination, separate web receiving means upon which sections of the web are wound, a motor for operating each of said means, a generator for supplying power to said motors, means including a rheostat for adjusting the loads upon the motors and means including a wattmeter responsive to the total web tension for regulating said generator to hold the web tension constant.

2. In combination with a revolvable web receiving roll and an electric motor for revolving said roll, a generator, circuit portions connecting the armatures of said motor and said generator, electric current supply leads for the fields of said motor and said generator, a rheostat for the generator field, a reversible motor for controlling said rheostat, a wattmeter, wiring connecting said reversible motor with one of said leads, wiring also connecting the last mentioned motor and said wattmeter, wiring connecting the needle of said wattmeter and the other of said leads, wiring portions connecting said wattmeter and the aforesaid circuit portions, and contacts carried by the second mentioned wiring and disposed adjacent said needle, whereby the latter may engage one of said contacts to control said reversible motor for causing uniform tension on said web, said web being normally subject to variation of its tension as said roll increases or decreases in diameter during the winding operation.

HARRY E. NEUS.